United States Patent Office 2,759,149
Patented Aug. 14, 1956

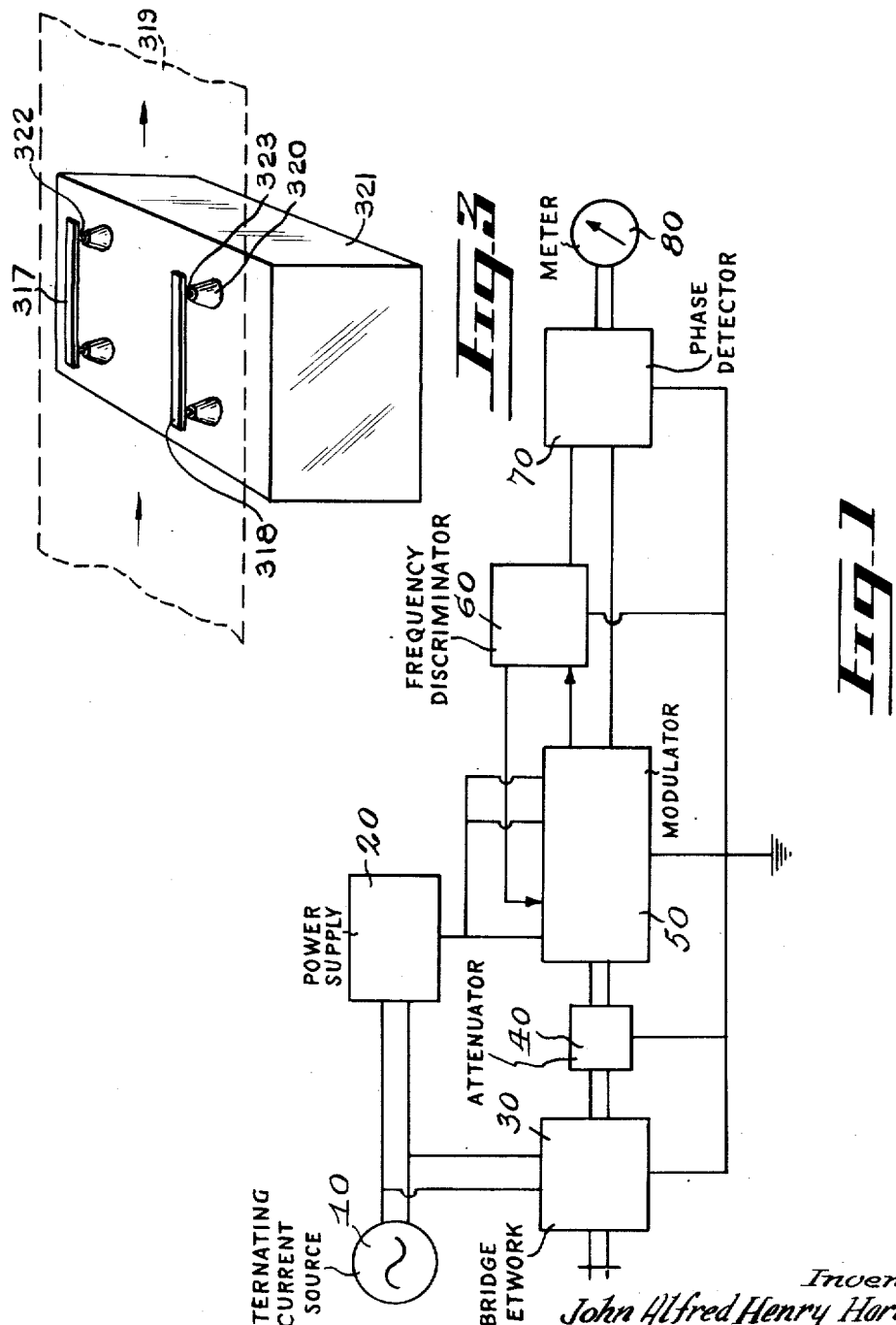

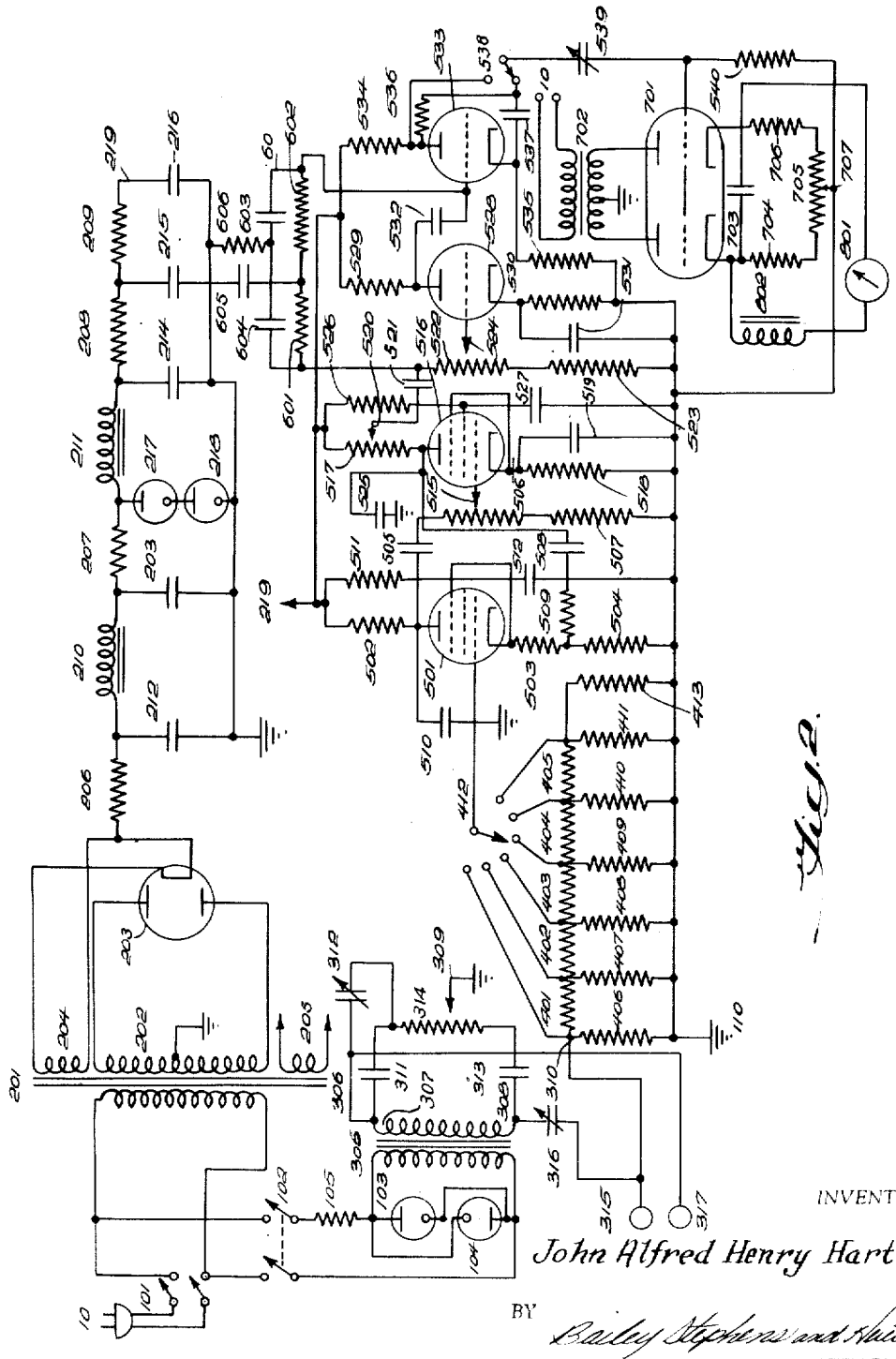

---

2,759,149

MOISTURE MEASURING APPARATUS

John Alfred Henry Hart, Ottawa, Ontario, Canada

Application July 24, 1951, Serial No. 238,293

3 Claims. (Cl. 324—65)

This invention comprises improvements in methods of and apparatus for measuring electrical resistance and in particular measurements of the electrical resistance of materials or bodies of high resistivity such as paper, coated paper, textile fabrics, films of cellulose derivative or synthetic resins; coatings upon supports of insulating material such as sensitized or unsensitized gelatin layers of photographic materials or veneers of wood.

It is an object of this invention to provide means and method for measurnig electrical resistance of materials or bodies of high resistance whose resistivity is a function of their moisture content.

It is an object of this invention to provide means and method for measuring electrical resistance of materials of high resistance which eliminate to a large degree the contact errors caused by variations in the contact resistance between the material contacting electrodes of the measuring means (hereafter called electrodes) and the material whose resistance is being measured.

It is an object of this invention to provide a means and method for measuring electrical resistance of materials of high resistivity which allows for the elimination of electrostatic or capacitive effects between the electrodes of the measuring means thereby preventing these effects from affecting the precision of the resistance measurement.

It is an object of this invention to provide a means and method for measuring electrical resistance of materials of high resistivity which negates the effect of electrostatic charge accumulation or eddy currents which may exist in the material being measured.

A specific object of this invention is to provide a method and means for measuring the moisture content of solid laminar bodies such as paper, textile and other sheets or webs and the invention includes features especially devised and adapted for use in measuring the moisture content of a moving web of material.

It is an object of this invention to measure the moisture content of such webs and the like by measuring the electrical resistance of the web by pasing a current therethrough and whereby the value obtained may be converted into moisture content values.

Having regard to previous paragraph, it is an object of this invention to provide means for discriminating between the resistive component of the current and any reactive component and measuring the former.

It is a further object of this invention to provide a measuring apparatus for obtaining the moisture content of such a web or the like so designed that varying thicknesses or densities of the web have a minimum effect upon the moisture content measurement.

The method involves the measurement of resistance in the plane of the paper or web and utilizes two spaced electrodes contacting the plane of the material being tested. The electrodes are supplied with an alternating voltage of low frequency and the current flowing therethrough is amplified and the resistance component filtered and measured. Provision is made for compensating for the inter-electrode capacitance so that the only portion of the current flowing through the material to be tested which must be eliminated is the capacitance due to the electrodes acting as condenser plates and the material acting as the dielectric.

This method will be seen to have many advantages accruing from the steps involved.

Resistance has been selected as that electrical quality of the material which is most indicative of the moisture content of the material rather than the dielectric constant of such sheet materials; in the case of paper whose moisture content is less than about 5%, the changes of capacity between any practical electrode system with changes in moisture content are generally too small to measure accurately. Moreover, it is necessary to know accurately the quantity of the sheet material between the electrodes, since changes in the quantity of material cause changes in capacity which might be interpreted as changes in moisture content where none exists. This method described herein is based upon the supposition that the dielectric constant of water is very much greater than that of the materials such as cellulose or gelatin whose moisture content is to be measured. It is well known however that the small amounts of water contained in materials such as paper in equilibrium with normal atmospheres of 20–60% relative humidity are physically bound to the adsorbing material and have a dielectric constant considerably lower than that of free water.

The changes in conductance of moisture-containing materials with changes in moisture content are very great. The conductance of paper, for example, changes by five times approximately when the moisture content changes from 4 to 5%, and 25 times when the moisture content changes from 4 to 6%. Conductance is therefore a very sensitive indicator of moisture content.

Changes in the amount of material between the measuring electrodes produce a change in conductance directly proportional to the change in amount. When measuring moisture content by means of conductance therefore, a change in the amount of material between the electrodes of as much as five times will cause a change of only 1% in apparent moisture content. In the practical use of the method for measurement of moisture content in the control of industrial drying processes as in the manufacture of paper or cellophane, the normal random variations in thickness or substance which occur, produce only a negligibly small error in determination of moisture content.

The use of spaced electrodes so that the path length of current flow is large compared to the thickness of the web or the like makes the contact resistance effects very small in relation to the resistance encountered by the current in the sheet itself so that the measurement obtained is indicative only of the resistance in the material and contact effects are negligible.

The use of an alternating E. M. F. further diminishes contact errors since in this way it is possible to provide a capacitive coupling of low impedance the variations of which, due to variations in the tension, to lack of flatness or to the flapping of moving sheets or webs are again negligible in comparison to the resistance of the material.

The use of a low frequency alternating E. M. F. relatively diminishes the capacity component of the current flow through the material and the frequency selected will be such as to make the capacitive component of the current flow through the material as small as possible without being so small that the values of contact impedance at the electrodes are of a value comparable to the impedance to current flow through the material. A second lower limitation on the frequency is the difficulty of amplifying very low frequencies by resistance-capacity coupled vacuum tube amplifiers.

The capacitive coupling is increased by providing that the electrode surfaces which contact the sheet are of large area.

With the use of alternating current the problem arises that the capacity between the measuring contacts is sufficient to make the current, which in this manner bypasses the material, of sufficient size to seriously affect the accuracy of the resistance measurement and in the case of materials of very high resistivity the bypass current may be much greater than that flowing through the material. Means are therefore provided by which this current flow may be cancelled out so that the current which is measured is the difference between the current flow when the contacts are remote from the material and the current flow when the contacts are touching the paper. In the method described herein, therefore, the compensating means described above are adjusted to cancel out the effects of interelectrode capacitance prior to the measurement of resistance.

The apparatus for carrying out the disclosed method comprises a set of electrodes adapted to make electrical contact with the material in spaced relationship to each other, means for supplying an alternating current to the contacts, means supplying a signal voltage as a result of the voltage drop and current flow between the electrodes, means for amplifying the signal due to the voltage drop and current flow between said electrodes, and means for filtering out and measuring the resistive component of the current flow.

In accordance with the previous description the signal supplying means is adapted to allow proper adjustment to compensate for the inter-electrode capacitance so that when the electrodes are out of contact with the material and the A. C. is applied, the output of the signal supplying means is zero and when the electrodes are in contact with the material the output is due only to the voltage drop and current flow in the material.

A feature of the apparatus is that the signal developed by the signal supplying means due to current flow through the sheet or web is amplified and measured by devices which do not respond to zero frequency. Static electricity on the sheet caused by friction may flow into an electrode and thence through the input resistance of the amplifier and there create a unidirectional voltage. By properly choosing the amplifier input resistance the voltage created does not alter appreciably the operating characteristics of the first amplifying tube, and because the amplifier does not respond to zero frequency, that is unidirectional voltages, the final indicator is entirely insensitive to the effects of static electricity on the sheet.

The electrodes may be of various shapes and arrangements to suit the material being measured and the conditions under which the measurement is taking place. The inter-electrode capacity compensating means might take various forms but the arrangement disclosed specifically herein forms what is believed to be the optimum for the purpose and as such is claimed as a subsidiary part of the invention. The frequency of the alternating current may be varied between an upper and a lower limit whose actual values will be set by the particular materials being measured and the conditions under which it is being measured. The frequency must be sufficiently large so that the capacitive coupling impedance between the electrodes and the material whose resistance is being measured is small compared to the resistance to current flow between the electrodes in the material and on the other hand must not be so high that the capacitive component of the current flow through the material is much greater than the resistive component.

Since the phase angle between the resistive and capacitive components of the current flow through the material is important so that the resistive component may be filtered out, and since this phase shift in the apparatus varies with frequency, it is desirable that the frequency be restricted and controlled in the measuring apparatus. Therefore where the amplifier or the A. C. source is such that harmonics and unwanted frequencies are likely to be superimposed on the signal frequency during amplification, a frequency discriminating circuit is provided which attenuates all frequencies but that desired and in which the attenuation increases with the frequency difference from the desired frequency.

The invention having now been described generally, a specific embodiment is disclosed below. This specific embodiment is designed to measure the moisture content of paper sheets on moving rolls and is not meant to be limiting but merely portrays the best method of accomplishing the objects of this invention when applied to this purpose.

Reference may be had to the attached drawings in which:

Figure 1 is a block diagram of the measuring circuit.

Figure 2 is a detail drawing of the measuring circuit.

Figure 3 is a view showing one possible form of the electrodes, for use with the specific embodiment, in contact with the paper roll.

Referring to Figure 1, there is disclosed an alternating current source 10 which supplies power to the D. C. plate supply 20 and to a resistance-capacitance bridge 30. In one arm of the bridge 30 are the electrodes which contact the paper roll. This bridge is adapted to be balanced when the electrodes are out of contact with the paper roll so that the output signal of the bridge is due only to current flow through the paper. The bridge output signal is supplied to an attenuator system 40 and the attenuated signal is applied to amplifier system 50. The amplified signal is passed through frequency discriminator 60. The frequency discriminator 60 supplies a negative feedback path to one of the amplifier stages and is so designed that it acts as an infinite impedance to signals of the desired frequency but as an impedance whose value varies inversely with the difference between the actual and the desired frequency. Thus the undesired frequencies are negatively fed back and their strength is attenuated while the desired frequency is passed on unimpeded to a phase selector 70. The phase selector selects and amplifies the component of the signal which corresponds to the resistive component of current flow in the paper roll and this component is supplied to a measuring meter 80.

The meter is thus able to give a reading which is indicative of the resistance of the paper sheet between the spaced electrodes.

Referring now to Figure 2 the A. C. source 10 supplies power to transformer 201 through switch 101. This transformer has its main secondary winding 202 centrally grounded with the ends each connected to one of the plates of the full wave rectifier tube 203. Secondary winding 204 supplies filament current to the rectifier tube 203 while secondary winding 205 supplies 6.3 v. filament current to other tubes in the circuit. The ripple in the rectifier output is eliminated by the filter system shown and is composed of resistances 206, 207, 208 and 209 and choke coils 210 and 211 in series with the cathode and capacitances 212 to 216 connecting the line to ground. The value of the plate voltage is kept constant by voltage regulator tubes 217 and 218 in series connecting the cathode circuit to ground.

The switch also supplies power through switch 102 to a voltage regulator system composed of voltage regulator tubes 103 and 104 as shown. The regulator system and resistance 105 supplies an amplitude limited voltage to transformer 305 and the secondary winding is connected to the input terminals 307 and 308 of resistance-capacitance bridge 306. Output terminal 309 is grounded while ouput terminal 310 is connected to the attenuator system 40. In the arm 307—309 are capacitance 311 and variable capacitance 312 in parallel while in arm 308—309 is capacitance 313. The terminal 309 has a contact which is adjustably connected to resistance 314 and which divides this resistance into a section which is in series with capacitances 311 and 312 and a section which is in series with capacitance 313. Arm 307—310 contains the material contacting electrodes, and therefore the material between them when the instrument is being used for measuring purposes. The electrodes made of the optimum shape for moisture measurement are connected to high voltage terminal 314 and grid terminal 315 in arm 307—310. Arm 308—310 contains variable capacitance 316.

The arm capacitances are chosen so that the capacitance of condenser 316 is approximately equal to the capacity between the electrodes, for example about 5 $\mu\mu$f. This is the condition for maximum sensitivity of the bridge.

In order to balance the bridge the total capacitance in the arm including condenser 311 must be approximately equal to the total capacitance of the arm which includes condenser 313.

The capacitance between the inner conductor of the shielded lead connecting terminal 317 to one of the electrodes may be of the order of 1000 $\mu\mu$f. if fifty feet of cable whose capacitance is 20 $\mu\mu$f. per foot is used. This capacity is effectively in parallel with capacitor 311 and condenser 313 must therefore be 1000 $\mu\mu$f. larger in capacity than condenser 311.

In order to minimize the effect of variations in the capacities of the electrodes, cables and bridge elements to ground it is desirable that the capacity of condenser 313 is of the order of 1000 $\mu\mu$f. or greater. Capacitances of about 5000 $\mu\mu$f. are especially suitable. Practical condensers of this order of capacity invariably show some small leakage, and adjustment of the arm 309 on the resistance 314 serves to enable these small leakages to be balanced. The value of resistance of 314 is as low as will give proper balancing, since too high a value will introduce in greater degree the characteristic of bridges which contain both resistive and reactive elements of balancing exactly at only one frequency so that harmonics of the source frequency are not completely balanced.

The purpose of resistor 314 and adjustable contact 309 is to give resistance balance in the bridge when the electrodes are out of contact with the roll. Such an adjustment is required because of the leakage in the condensers of the bridge.

The arm capacitances, including the inter-electrode capacity, are selected so that a balanced condition is obtained with the correct applied frequency. This however is not exact, so that variable capacitance 312 forms a fine, and variable capacitance 316 forms a coarse, adjustment, to obtain balance. With balance obtained and the electrodes contacting the paper roll, the output of the bridge is obtained between terminals 310 and 309, the latter being grounded. The arm 308—310 contains the variable condenser 316 which is of the same order of capacity as that between the electrodes, and must be of very low inter-plate leakage. A suitable form of condenser is one in which the plates are separately mounted on insulators of low dielectric loss, attached to grounded metal support so that direct leakage between the plates is eliminated. The output terminal 310 is connected to the attenuator system 40, as shown, composed of series resistances 401 to 405 which are normally of equal value and alternately spaced parallel resistances 406 to 411 connecting the series resistances to a common ground 110.

These latter resistances are usually also of another equal value. At the junction of each parallel and series resistance referred to above there is a lead to one of the contacts of a rotary multipoint switch 412. The arrangement of the resistances and the provision of the switch 412 allows for proportional range switching so that the system as a whole can handle values of material resistance varying through a wide range. Due to the lack of proportionality when the highest attenuation switch setting is used, a compensating resistance 413 is provided in parallel with parallel resistance 411.

The central terminal of switch 412 is connected to the control grid of a pentode 501 which receives plate power from terminal 219 of plate supply 20 through plate resistance 502, while the cathode of this tube is grounded through resistances 503 and 504. The plate voltage of pentode 501 is applied through capacitance 505 and a variable proportion of resistance 506 to the grid of the next amplifier stage, this grid being grounded through resistance 507. Movable contact 515 riding on resistance 506 varies the amplitude of the grid signal. The level of the screen grid of pentode 501 is set by resistance 511 and capacitance 512.

The output signal of tube 501 is applied to the control grid of pentode 516 as already described. In the pentode plate circuit is resistance 517 and grounding the cathode are resistance 518 and capacitance 519 in parallel. A proportion of the plate voltage is obtained for the next succeeding stage by movable contact 520 adjustable on resistance 517. The signal thus obtained is transferred through condenser 521 and resistances 522 and 523. Variable contact 524, movable along resistance 522, is connected to the control grid of the next following stage. Condenser 525 effectively grounds the higher than desired frequency components of the plate signal. The screen grid level is set by resistance 526 and condenser 527.

The signal appearing at conact 524 is applied to the grid of triode 528, which utilizes plate resistance 529 and parallel cathode resistor 530 and condenser 531. The voltage appearing at the plate of triode 528 is applied through condenser 532 to the grid of the next amplifier stage. The voltage is also applied to frequency discriminator 60 which acts as an infinite impedance to signals of the desired frequency but which negatively feeds back other frequencies to the grid circuit of the triode 528.

The frequency discriminator 60 consists of parallel-T circuits, one T being composed of series resistances 601 and 602 and grounding condenser 603 and the other T being composed of series capacitances 604 and 605 and grounding resistance 606. The characteristics of such a circuit in feeding back proportions of all but the desired frequency and feeding back proportions which increase with the difference between the frequency fed back and the desired frequency, are well known.

The triode 533 which receives the signal of the desired frequency through condenser 532 has plate resistance 534 and cathode resistance 535. The cathode and plate of this tube are connected by resistance 536 and capacitance 537 which are selected to supply equal impedances to the desired frequency. A point between the capacitance and resistance of this circuit is connected to one of the terminals of a single pole double throw switch 538 while the other pole is directly connected to the plate of triode 533. The "pivot" terminal of the switch is connected through capacitance 539 to the grids of the frequency selector tube 701 and these grids are grounded through resistance 540. It is thus seen that switch 538 provides 90° phase switching action to control the phase of the signal applied to frequency selector tube 701. Adjustment of phase is obtained by alteration of the value of capacitance 539.

The frequency selector tube is a parallel twin triode.

The plate supply is obtained from the centre grounded secondary of transformer 702 which obtains its power from the A. C. source 10. The twin cathodes are connected by capacitance 703 in parallel with series resistances 704, 705 and 706. Movable contact 707 grounds some portion of resistance 705 and is used to adjust the currents through the triodes so that for zero signal through the triode grids, the current which flows through meter 801 which is also connected between the twin cathodes in series with choke coil 802 is zero. As will be obvious from the circuit just described, the phase detector in combination with switch 538 is adapted to amplify one component of the current supplied to the grids of the twin triode and to reject the other component. The phase adjusting elements are therefore adjusted to select the resistive component of the selected current. The switch is provided so that for the purpose of balancing the bridge, the phase detector may be made to respond to the capacitive component of bridge unbalance.

The reading on the meter 801 is therefore indicative of the magnitude of the resistive current which flows between the electrodes.

By constructing a graph or calibration chart relating the paper resistance values to the moisture content, the moisture content described may be obtained.

When measuring the moisture content of sheets whose moisture content is low, the increase in inter-electrode capacity brought about by the added dielectric when a sheet is placed in contact with the electrodes may produce a signal at the bridge terminals of the same order of magnitude as that due to conductance within the sheet between the electrodes, and the magnitude of this signal will vary in direct proportion with the substance or weight per unit area, and with the dielectric constant of the sheet.

The entire amplifier is so designed that no appreciable change in phase occurs when the signal amplitude changes or the gain controls are operated, and means for achieving these ends are well known to those skilled in the art.

With regard to the frequencies which should be used with the circuit and method herein described when making determinations of the moisture content of paper, frequencies of between 20 and 200 cycles have been found to be most suitable. Frequencies lower than 20 are difficult to amplify by conventional resistance coupled amplifiers and for frequencies above 200 cycles the capacitive admittance of the electrode system may tend to become inconveniently large relative to the conductances to be measured.

It is known that equal arithmetic intervals of moisture content change bring about equal geometric intervals of conductance change, and consequently the logarithm of the conductance of the sheet material is in direct proportion to its moisture content. If desired therefore the amplifier may therefore be arranged so that its output is directly proportional to the logarithm of its input voltage so that a linear meter in its output circuit may be calibrated to read directly in moisture content with a linear scale.

In order to accomplish this therefore the bridge output is amplified, and the amplified signal applied to a phase sensitive detector as described herein and the D. C. output then applied to the control grid of a variable mu pentode whose plate current is indicated by a meter. It is a property of variable mu pentodes that their plate current is a logarithmic function of their grid voltage and the plate current indicating meter may then bear a calibration linear with moisture content.

The selected method of applying the electrodes to the paper rolls may be seen by reference to Figure 3. In this figure the paper web is shown in phantom and the electrode supporting apparatus is shown in detail. The electrodes are arranged as two parallel bars 317 and 318 with their long axes parallel to the direction of travel of the paper 319 and with the paper resting on them as it moves by. The electrodes are supported by insulators 320 from a base member 321 which acts as a ground. Leads 322 and 333 connect electrodes 317 and 318 to contacts 314 and 315 and are provided with electrostatic shielding.

It will be seen that by arranging insulators 320 on a grounding base member 321 that an error in readings is avoided. If the electrodes were attached to a common insulator, the conductivity of the insulator would tend to approach the conductivity of the paper for low moisture contents and leakage currents through the insulator would cause a considerable error and would exist in the bridge unbalance. However with the arrangement as described, any insulator leakage which takes place, merely takes place to ground, and by referring to the wiring diagram of the bridge it will be seen that the error contribution of such leakage currents to ground is negligible. When used to measure moisture content of a paper web on a paper making machine these electrodes may be located anywhere where electrical coupling along the length of the paper is feasible, such as between the drying cylinders and calender stack or between calender stack and wind-up reel or between the first and second drying sections. They are herein shown as being applied between the final drying cylinder and the calender stack. No limitation is meant to be placed on the electrode construction described specifically herein. Other electrode arrangements, e. g. concentric rings, may be more suitable for other applications as in measuring resistance of samples of paper, as distinct from measurements on moving webs and for measuring the resistance of textile or other sheets or webs other forms of electrode may be devised.

It will be seen that there has been developed a method of accurately determining the resistance of materials of high resistivity and which includes a method of determining the resistance of materials of high resistivity and which includes a method of determining the resistance of moving webs or sheets and the like of paper or textiles and thereby determining the moisture content of such webs or sheets.

It will be seen that there has been developed an apparatus for carrying out such determinations and that this apparatus may be specifically designed to measure the moisture content of moving paper.

The term signal is used herein to denote either a voltage or current which is indicative of the resistive or capacitive or combined load of the material, web, sheet or the like between the electrodes. This inclusive definition follows since a voltage indication of load may be transformed to a current indication of load and vice versa in the measuring circuit as desired.

I claim:

1. An apparatus for measuring the moisture content of a material such as moving sheets, webs and the like, having high resistivity, comprising a source of alternating current connected to the input terminals of a resistance-capacitance bridge, electrodes adapted to be applied to spaced portions of the surface of the said sheet, web or the like contained in one arm of the said bridge, means for balancing said bridge when said electrodes are out of contact with said bridge, whereby when said electrodes are applied to said material a signal appears at the output terminals of said bridge as a result of the current flow through the said material, means for amplifying the said signal, means for attenuating undesirable frequencies in said amplified signal, means for selecting the portion of said signal which corresponds to the resistive component of the current flow through the said material.

2. An apparatus for measuring the moisture content of a thin material having high resistivity, comprising a resistance-capacitance bridge, a source of alternating current connected to the input terminals of said bridge, electrodes adapted to be applied to spaced portions of the surface of the said material contained in one arm of the said bridge, said electrodes having material engaging surfaces spaced apart in substantially the same plane and of elongated shape with their longer axes substantially parallel, means for balancing said bridge when said electrodes are out of contact with said material whereby when said electrodes are applied to said material a signal appears at the output terminals of said bridge as a result of the current flow through the said material, means for amplifying the said signal, means for attenuating undesirable frequencies in said amplified signal, and means for selecting the portion of said signal which corresponds to the resistive component of the current flow through the said material.

3. Means for measuring the resistance of a thin material of high resistivity comprising an alternating current bridge adapted to display an unbalance in response to a current flow through a portion of the said material located in one arm of the said bridge, means for applying alternating current to the input terminals of said bridge, means for amplifying the signal appearing at the output terminals as a result of said unbalance means for attenuating the undesired frequencies in said amplified signals and means for selecting a portion of the signal which bears a definite phase relationship to the alternating current applied to the bridge terminals and rejecting the signal which is 90° out of phase with the said selected signal whereby the resistive component of the current flow through said portion may be measured.

References Cited in the file of this patent

UNITED STATES PATENTS

| | | |
|---|---|---|
| 1,475,240 | Osborne | Nov. 27, 1923 |
| 1,589,450 | Wilson et al. | June 22, 1926 |
| 1,623,436 | Peschl | Apr. 5, 1927 |
| 2,217,626 | Strang et al. | Oct. 8, 1940 |
| 2,270,732 | Jones | Jan. 20, 1942 |
| 2,390,409 | Aiken | Dec. 4, 1945 |
| 2,432,390 | Darby | Dec. 9, 1947 |
| 2,485,579 | Elliott | Oct. 25, 1949 |
| 2,527,815 | Hart | Oct. 31, 1950 |
| 2,535,027 | Anderson | Dec. 26, 1950 |

FOREIGN PATENTS

| | | |
|---|---|---|
| 569,439 | Great Britain | May 24, 1945 |

UNITED STATES PATENT OFFICE
CERTIFICATE OF CORRECTION

Patent No. 2,759,149

August 14, 1956

John Alfred Henry Hart

It is hereby certified that error appears in the printed specification of the above numbered patent requiring correction and that the said Letters Patent should read as corrected below.

Column 5, line 8, for "terminal 314" read -- terminal 317 --; column 7, line 63, for "Leads 322 and 333" read -- Leads 322 and 323 --; column 8, line 45, for "bridge" read -- material --.

Signed and sealed this 7th day of October 1958.

(SEAL)
Attest:

KARL H. AXLINE
Attesting Officer

ROBERT C. WATSON
Commissioner of Patents